(12) United States Patent
Terjung

(10) Patent No.: US 11,666,077 B2
(45) Date of Patent: Jun. 6, 2023

(54) LIVER PÂTÉ AND METHOD FOR PRODUCTION

(71) Applicant: Deutsches Institut fuer Lebensmitteltechnik e.V, Quakenbrueck (DE)

(72) Inventor: Nino Terjung, Quakenbrueck (DE)

(73) Assignee: Deutsches Institut fuer Lebensmitteltechnik e.V, Quakenbrueck (DE)

(*) Notice: Subject to any disclaimer, the term of this patent is extended or adjusted under 35 U.S.C. 154(b) by 936 days.

(21) Appl. No.: 16/386,771

(22) Filed: Apr. 17, 2019

(65) Prior Publication Data
US 2019/0320694 A1    Oct. 24, 2019

(30) Foreign Application Priority Data
Apr. 20, 2018    (DE) .......................... 102018206169

(51) Int. Cl.
A23L 13/20    (2016.01)
A23L 13/50    (2016.01)
A23L 13/60    (2016.01)

(52) U.S. Cl.
CPC ............... *A23L 13/52* (2016.08); *A23L 13/67* (2016.08); *A23L 13/20* (2016.08)

(58) Field of Classification Search
CPC .......... A23L 13/42; A23L 13/43; A23L 13/52; A23L 13/67; A23L 13/20; A23J 1/10
See application file for complete search history.

(56) References Cited

FOREIGN PATENT DOCUMENTS

| CH | 690413 A5 | 9/2000 |
| DE | 2453729 A1 | 5/1975 |
| RU | 2485823 C1 * | 6/2013 |

* cited by examiner

*Primary Examiner* — Vera Stulii
(74) *Attorney, Agent, or Firm* — Greer, Burns & Crain, Ltd.; Steven P. Fallon

(57) ABSTRACT

A method for producing liver pâté that models classic goose liver pâté made of goose foie gras. The liver pâté does not contain foie gras and only humanely produced raw materials are used. Aqueous jelly is obtained from collagen-containing animal tissue and concentrated into water-soluble jelly. Liquid fat is obtained from animal fat tissue. Raw strained animal liver is obtained by separating solid components. The concentrated aqueous jelly, liquid fat and strained raw liver are mixed, cured and cooked in a container.

16 Claims, 1 Drawing Sheet

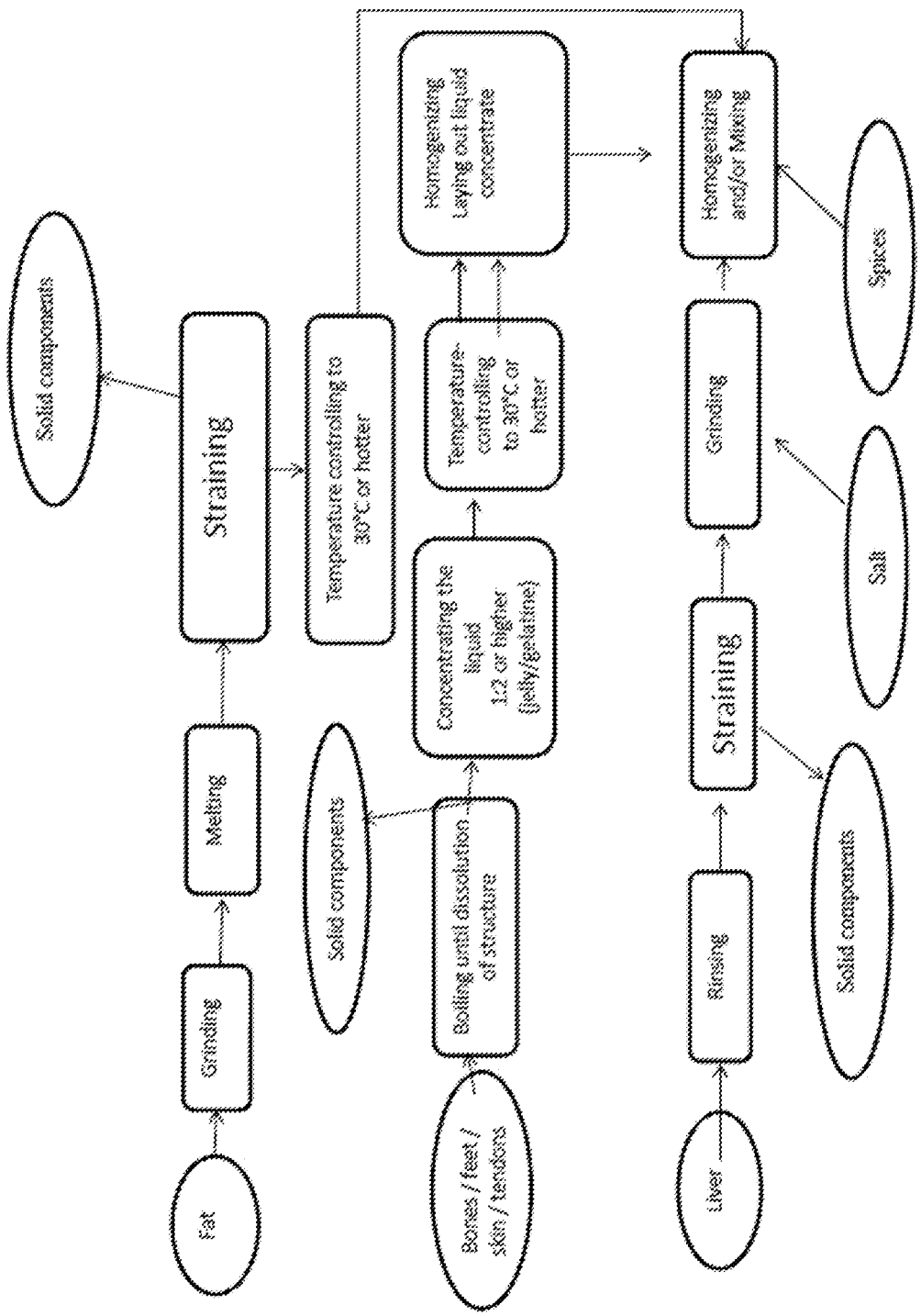

LIVER PÂTÉ AND METHOD FOR PRODUCTION

PRIORITY CLAIM

This application claims priority under 35 U.S.C. § 119 and all applicable statutes and treaties from prior German Application DE 10 2018 206 169.6, filed Apr. 20, 2018.

FIELD OF THE INVENTION

The patent invention relates to a method for producing a liver pâté, which is similar, with respect to its flavour and perception, to a very significant degree to a classic goose liver pâté made of goose foie gras. The method and the thus produced liver pâté have the advantage that they do not use or contain foie gras so that only humanely produced raw materials are used.

BACKGROUND

As a substitute for goose liver pâté, CH 690 413 A5 describes a mixture of marinated duck liver with emulsifying and thickening agents that can both be, e.g. egg yolk, and fat, e.g. butter, and subsequent cooking.

DE 24 53 729 A1 describes the production of a foodstuff consisting of 60% whole, i.e. unground, poultry liver, 20% poultry fat and 20% eggs, milk, cognac and other ingredients.

The production of goose liver pâté and/or duck liver pâté from so-called foie gras from geese or ducks is known, foie gras being characterized by an extremely high fat content. At least in Germany the force-feeding of geese is prohibited due to animal protection concerns. The production of goose foie gras is prohibited in Germany in accordance with Article § 3 No. 9 of the Law for the Protection of Animals (TierSchG; version from 2006); however, its import is still tolerated.

SUMMARY OF THE INVENTION

The invention provides a method with which liver pâté can be produced without the use of foie gras and only from humanely produced raw materials. According to a preferred embodiment, the method and the thus produced liver pâté are characterized in that only animal ingredients, salt, nitrite curing salt and spice are used, i.e. the liver pâté consists of the latter. Accordingly, preferably no thickening agents, no emulsifying agents, no stabilizing agents, no vegetable fats and/or no flavour enhancers or flavouring agents are added in the method, and the liver pâté is free of the same.

The invention provides a method with which liver pâté can be made exclusively from humanely produced animal raw materials, in particular without force-feeding the animals, the liver pâté being of high quality with respect to its flavour and texture and preferably being similar to goose liver pâté made of goose foie gras with respect to its flavour and structure.

A preferred method for producing liver pâté comprises or consists of the following steps: boiling collagen-containing animal tissue in water until the dissolution of its structure, separating off solid components for the production of aqueous jelly and concentrating the aqueous jelly by removal of water up to at least a concentration of a maximum of half, e.g. up to a maximum of 40%, a maximum of 30%, a maximum of 20% or a maximum of 10% of the weight of the collagen-containing tissue used for the production of concentrated water-soluble jelly, grinding animal fat tissue, melting the fat and separating off undissolved components for the production of liquid fat, rinsing raw animal liver in cold water, straining the same through a sieve in order to separate off solid components, optionally additionally grinding the strained components, for the production of raw strained liver, homogenizing
15-25 wt % concentrated aqueous jelly,
30-50 wt % liquid fat,
10-40 wt % raw strained liver,
nitrite curing salt and/or table salt and spices for the production of a liver pâté mass, filling the liver pâté mass, e.g. into closed containers, preferably with a vacuum, and cooking the same.

BRIEF DESCRIPTION OF THE DRAWING

Further features and embodiments of the present invention will be described hereinafter based on the figure.

FIG. 1 is a diagram of a preferred in which the animal fat tissue (fat) is ground and melted and strained in order to remove solid components:

DETAILED DESCRIPTION OF THE PREFERRED EMBODIMENTS

In preferred methods for producing liver pâté, the animal fat tissue can be any fat tissue, e.g. subcutaneous fat and/or intestinal fat, and can stem from any animal suitable for consumption, e.g. pigs, less preferably cattle, preferably fowl, e.g. turkey, chicken and/or guinea fowl, more preferably duck and/or goose. The melting of the fat can occur e.g. by heating the fat tissue to approximately 50° C. Preferably, the fat is heated to a temperature at which the protein it contains denatures, e.g. to 50° C. for at least 30 min, or e.g. for at least 1 h, e.g. up to 2 h or up to 1.5 h. The separating off of undissolved components can occur by straining and preferably also separates off denatured protein.

Collagen-containing animal tissue is e.g. skin, tendons, bones, cartilage and/or feet. By boiling in water, e.g. at 80 to 100° C., an aqueous jelly containing dissolved gelatine is produced, which is subsequently concentrated by the removal of water to a maximum of half (50%), e.g. up to a fifth (20%) of the weight of the animal collagen-containing tissue used. The separating off of water occurs e.g. by the evaporation of water, optionally under vacuum, or by means of a membrane separation process. The collagen-containing animal tissue can stem from any animal suitable for consumption, e.g. pigs or cattle, preferably from fowl, e.g. turkey, chicken and/or guinea fowl, more preferably duck and/or goose.

The liver can stem from any animal suitable for consumption, e.g. pigs or cattle, preferably from fowl, e.g. turkey, chicken and/or guinea fowl, more preferably duck and/or goose. Before grinding, the liver is preferably rinsed for at least 2 h in running cold water. The straining of the liver preferably occurs through a sieve with openings of a maximum of 1 mm, e.g. of a maximum of 0.5 mm, in order to remove e.g. bile ducts as solid components. Optionally, the strained liver can be further minced, e.g. by cutters or similar slicing methods.

Preferably, all animal components stem from duck and/or from goose.

The nitrite curing salt is added to the liver preferably before or after the straining and the liver is subsequently left to redden, e.g. by storage at a maximum of 5° C., e.g. at 2° C., for at least 12 h, e.g. for up to 24 h.

Preferably, the concentrated aqueous jelly is initially homogenized with the liquid fat until homogeneity, in particular until there is an increase in viscosity, e.g. up to 30,000 mPa·s, measured with a rotation viscometer at the temperature of the mixture, and this mixture is subsequently mixed with the raw strained liver. Therein, the concentrated jelly is further preferably placed in a mixing vessel and the liquid fat is added gradually under stirring. Alternatively, the raw strained liver can be initially mixed with the liquid fat until homogeneity and the concentrated aqueous jelly is mixed in subsequently.

Optionally, the liquid fat and the concentrated aqueous jelly can be brought to the same temperature before mixing, e.g. to at least 30° C., e.g. up to 100° C.

In addition to nitrite curing salt, spices and optionally table salt can also be mixed in at each step, e.g. added during the mixing of the liquid fat, of the concentrated aqueous jelly and/or of the raw strained liver.

The homogenization can be a mixing that is preferably carried out until a homogeneous mass is produced. The mixing can occur with a mixer, e.g. a mixer which can be a high-speed mixer, or with a homogenizer, which is e.g. a rotor-stator homogenizer, a cutter or a colloid mill.

The cooking can occur at 70 to 120° C., e.g. until a core temperature of at least 58° C., e.g. up to 120° C., is reached, e.g. for at least 10 min.

The invention will now be described in greater detail with reference to FIG. 1 and by way of an example. FIG. 1 shows schematically the method in which the animal fat tissue (fat) is ground and melted and strained in order to remove solid components. In preferred methods, the liquid fat is heated to at least 30° C. before mixing.

As animal tissue containing collagen, bones, feet, skin, tendons or a mixture of at least two of these (bones/feet/skin/tendons) are boiled in water until the dissolution of their structure and the solid components are separated off in order to obtain an aqueous jelly, which is subsequently concentrated to a concentrated jelly, which is water-soluble or aqueous, up to a maximum of 50 wt %, e.g. to 10 wt % of the mass of collagen-containing animal tissue used. The obtained jelly contains dissolved gelatine (designated in the figure as jelly/gelatine). The concentration can occur e.g. by evaporation of water, optionally under vacuum. As preferred, the concentrated jelly is brought before mixing to a temperature of at least 30° C.

The liver is first rinsed in running cold water, e.g. at 2 to 8° C., in order to remove bile fluid, meat juice and similar fluids, subsequently strained by sieving and ground, wherein solid components are separated off, e.g. by straining through a perforated plate with apertures with a diameter of 0.5 mm. As preferred, nitrite curing salt (designated as salt in the figure), optionally additionally table salt, is mixed into the strained raw liver and the strained raw liver is left to redden.

The liquid fat, the concentrated jelly, each preferably heated separately, are mixed with spices with the strained, preferably reddened, liver, and preferably mixed to homogeneity (homogenization/mixing).

The invention further relates to a liver pâté that can be produced with the method, which liver pâté is characterized in that it consists exclusively of raw materials produced in accordance with animal protection principles and contains no thickening agents, no emulsifying agents, no stabilizing agents, no vegetable fats, no phosphates, and preferably no flavour enhancers and no synthetic flavouring agents. The liver pâté according to the invention consists of 15-25 wt % concentrated aqueous jelly, 30-50 wt % fat, 10-40 wt % raw strained liver, nitrite curing salt and/or table salt and spices and is a homogeneous mass which preferably is subsequently cooked. Contained spices can be port wine, e.g. at 0.1 to 2 wt %, sugar, e.g. at 2 to 4 wt %, pepper, e.g. at 10 to 20 g/kg, optionally antioxidants, e.g. Na ascorbate, e.g. at 1 to 2 g/kg, each calculated in relation to the total mass of the aqueous jelly, fat and raw strained liver.

EXAMPLE

Production of Liver Pâté

As collagen-containing tissue, 10 kg of necks of freshly butchered ducks are boiled for approx. 12 h in water so that their structure dissolves. The aqueous phase was separated off by straining and boiled down to 5 kg, corresponding to one half of the initial weight. Fat is removed.

As animal fat tissue, 12.5 kg of duck intestinal fat was ground, heated to liquefaction and strained through a sieve with 0.5 mm meshes in order to remove solid matter.

7.5 kg of duck liver was rinsed for approx. 2 h in running tap water, approx. 2° C. Through a straining machine with meshes of 0.5 mm, solid components, e.g. bile ducts, were removed. The raw materials stemmed from ducks that had been raised without force-feeding.

From the intended total mass of the liver pâté, 20 wt % concentrated jelly was placed in a mixing vessel and 50 wt % fat was poured in very gradually over 20 min and were homogenized under stirring. This mixture was brought to a temperature of approx. 50° C. and optionally homogenized, e.g. by a rotor-stator homogenizer, a cutter or by a colloid mill. Added to and mixed in with this mixture as spices under stirring were 1 wt % nitrite curing salt, 0.1 to 2 wt % port wine, 2 to 4 wt % sugar, 20 g/kg pepper, 1 to 2 g/kg sodium ascorbate as antioxidant, each in relation to the total mass of concentrated jelly, strained liver and fat.

Strained liver was placed at 30 wt % of the intended total mass in a mixing vessel and the mixture of concentrated jelly, fat, spices and nitrite curing salt was gradually added over approx. 5 min under stirring and further mixed until homogeneity. The thus produced liver pâté mass was filled under vacuum into containers at 100 g apiece, sealed and cooked at 80° C. for 60 min.

The method was repeated with necks, fat tissue and liver from geese that had been raised without force-feeding.

The sensory test showed that untrained test subjects could not detect any differences from liver pâté produced from foie gras from ducks or geese.

The invention claimed is:

1. Process for the production of liver pâté, comprising steps of:
   producing concentrated jelly by
      boiling collagen-containing animal tissue in water until the dissolution of its structure,
      separating off solid components for the production of aqueous jelly and
      concentrating the aqueous jelly into the concentrated jelly by the removal of water up to a maximum of 50% of the weight of the collagen-containing animal tissue,
   producing liquid fat by
      grinding animal fat tissue,
      melting the fat and separating off undissolved components to obtain the liquid fat, producing strained raw liver by rinsing raw animal liver in cold water, grinding and straining the same through a sieve in order to separate off solid components to obtain the strained raw liver, mixing of 15-25 wt% of the concentrated jelly, 30-50 wt% of the liquid fat and 10-40 wt% of the strained raw animal liver into a mixture, nitrite curing, salting and/or spicing the mixture to obtain a liver pâté mass, filling of the liver pâté mass into a container and cooking.

2. Process according to claim 1, wherein the collagen-containing animal tissue comprises skin, tendons, bones, cartilage and/or feet.

3. Process according to claim 1, wherein nitrite curing salt is added to the strained raw liver.

4. Process according to claim 1, wherein the grinding and straining of the raw animal liver occurs through a sieve with apertures of a maximum of 1 mm.

5. Process according to claim 1, comprising addition of nitrite curing salt to the raw strained liver and allowing reddening at maximally 5° C. for at least 12 h.

6. Process according to claim 1, wherein the raw animal liver is rinsed for at least 2 h in running cold water before grinding.

7. Process according to claim 1, wherein the melted animal fat is strained through a sieve with meshes of a maximum of 1 mm in order to separate off undissolved components.

8. Process according to claim 1, wherein the melted animal fat is heated to a temperature at which the protein it contains denatures, and denatured protein is separated off together with the undissolved components.

9. Process according to claim 1, wherein the raw animal liver is fowl liver.

10. Process according to claim 1, wherein the concentrated jelly is first homogenized with the liquid fat and this mixture is subsequently mixed with the raw strained liver.

11. Process according to claim 1, wherein the animal fat tissue is subcutaneous fat, intestinal fat or a mixture of both.

12. Process according to claim 1, wherein the animal fat tissue, the collagen-containing tissue and the liver stem exclusively from fowl.

13. Process according to claim 1, wherein the cooking occurs until a core temperature of at least 58° C. is reached for at least 10 min.

14. Process according to claim 1, wherein no thickening agents, no emulsifying agents, no stabilizing agents, no vegetable fats and/or no flavour enhancers or flavouring agents or phosphates are added during the process.

15. Liver pâté, in particular obtainable by a process according to claim 1, which consists of 15-25 wt% of the concentrated aqueous jelly, 30-50 wt% of the animal liquid fat, 10-40 wt% of the raw strained liver, nitrite curing salt and/or table salt and spices, and is a homogeneous mass.

16. Liver pâté according to claim 15, wherein the homogeneous mass is cooked.

* * * * *